United States Patent [19]

MacKay

[11] Patent Number: 5,191,320

[45] Date of Patent: Mar. 2, 1993

[54] VARIABLE SCALE INPUT DEVICE

[75] Inventor: Michael T. MacKay, Vallejo, Calif.

[73] Assignee: Sony Corporation of America, Park Ridge, N.J.

[21] Appl. No.: 622,727

[22] Filed: Dec. 15, 1990

[51] Int. Cl.⁵ .............................................. G09G 3/20
[52] U.S. Cl. ........................................ 340/706; 340/712; 340/753
[58] Field of Search ............... 340/706, 709, 710, 711, 340/712, 722, 753, 754, 806, 807, 808, 809; 395/118, 139, 140; 364/709.01, 709.02, 709.08, 709.11

[56] References Cited

U.S. PATENT DOCUMENTS

| | | | |
|---|---|---|---|
| 4,251,769 | 2/1981 | Ewert et al. | 340/753 |
| 4,847,785 | 7/1989 | Stephens | 395/139 |
| 4,868,549 | 9/1989 | Affinito et al. | 340/710 |
| 4,908,791 | 3/1990 | Giorgio | 340/710 |
| 4,961,138 | 10/1990 | Gorniak | 340/710 |
| 5,086,296 | 2/1992 | Clark | 340/706 |

Primary Examiner—Alvin E. Oberley
Assistant Examiner—Richard Hjerpe
Attorney, Agent, or Firm—Blakely Sokoloff Taylor & Zafman

[57] ABSTRACT

A variable scale device for providing signals indicating selection of an input value from a program controlled range of permissible values is disclosed. The device comprises of a belt, a first and second rollers, a rotary encoder, an interface for sending and receiving signals, a metering module having a plurality of visual displays and a forced feedback motor/clutch. Signals corresponding to the movement of the belt are encoded for sending through the interface to a processor coupled to the device. Based on the programmed responses received from the processor, visual and tactile feedback are provided to the user through the visual displays and the forced feedback motor/clutch. The program controlled range of permissible input values available for selection and the resolution of the selectable values may be dynamically set or reset by the user using the device. Furthermore, the program controlled range of permissible values supported may be increased without sacrificing the device resolution. Thus, the device provides functional and usability improvements over the traditional scaled input devices.

35 Claims, 5 Drawing Sheets

FIG_1

FIG_5

CONTROL CENTER

FIG_2A TOP VIEW

FIG_2B SIDE VIEW

FIG_6

VARIABLE SCALE INPUT DEVICE

BACKGROUND OF THE INVENTION

1. Field of the Invention

This invention relates to the field of input devices and more particularly to scaled input devices which can indicate selection of an input value from a range of permissible values.

2. Art Background

As the functions and capabilities of processor/microprocessor controlled machines/systems continue to increase, the need for user friendly and specifically tailored input devices also increase. For example, the mouse was developed to complement the traditional keyboard to facilitate easier cursor control and user selection of command options from pull down menus. Likewise, the joystick was developed to facilitate easier object movement and user selection of actions at certain locations. For a discussion of other widely used input devices, see Foley, J. D. & Van Dam, A., *Fundamentals of Interactive Computer Graphics*, (Addison-Wesley 1984), pp. 127–129.

In many of these processor/microprocessor controlled machines/systems, it is often desirable to allow the user to interactively select an input value from a range of permissible values. For example, scaled input devices such as dimmers or faders may be used to allow the user to indicate his/her selection. In a typical dimmer or fader device, a rotating knob or a sliding bar is used to facilitate the selection of the input value from the range of permissible values. The rotating knob or the sliding bar is a potentiometer or coupled to potentiometers that provide signals to indicate the selected input value. Some rotating knobs have multi-turn capabilities for improved resolution and range.

One common disadvantage of these dimmer or fader devices found in the prior art is that the range of permissible values available for selection and the resolution of the selectable values are often fixed. Thus, neither the range nor the resolution can be changed by the user. Furthermore, the range and the resolution provided by these devices are often limited. The configuration of these devices is such that a trade off exists between the range offered and the resolution offered. If the range is increased, the resolution must be decreased to stay within the physical limits of the device. Likewise, if the resolution is increased, the range must be decreased. Thus, the limitations are often too restrictive for a user who requires a wide range as well as a high degree of resolution.

In addition, these dimmer or fader devices provide little or no feedback to the user. For example, the user may not be 'informed' by the device of the current location of operation within the range of permissible values available for selection or how close to the outer limits of the range the user is operating. If any feedback is provided, external means such as a display is used in conjunction with the device.

SUMMARY OF THE INVENTION

It is therefore an object of the present invention to provide a scaled input device with improved functionality and usability.

It is further an object of the present invention to provide a scaled input device with a variable range of permissible values available for selection and a variable resolution for the selection of values.

It is an object of the present invention to provide a scaled input device with visual and tactile feedback capabilities.

These objects are realized by the variable scale input device of the present invention. The variable scale input device comprises an assembly having an axis of rotation, a rotary encoding means, a tactile feedback means and a processing means. The assembly is capable of rotating in either direction, clockwise or counterclockwise. The user provides his/her input by rotating the assembly circularly around its axis of rotation. Signals corresponding to the rotation of the assembly are encoded for transmission to the processing means. The processing means in turn sends its programmed responses to the tactile feedback means according to the program controlled range and resolution of the permissible values available for selection. Based on the programmed responses received, the tactile feedback means varies the resistance it applies against the rotation of the assembly.

The variable scale input device of the present invention is designed such that there are no physical limits to the number of revolutions the assembly may move around its axis. Thus, the device offers virtually no limits to the range and the resolution of the permissible values available for selection.

The programmed controlled range and resolution of the permissible values available for selection may also be interactively varied by the user. Thus, aided by the tactile feedback, the user may exploit the wide range and the high degree of resolution offered by dynamically rescaling the variable scale input device of the present invention in a practical and easy-to-use manner.

In the preferred embodiment described, the assembly comprises a belt suspended over a first roller at a first end and a second roller suspended over a second end. The tactile feedback means comprises a forced feedback motor/clutch for applying resistance against the rotation of the belt. The processing means comprises an interface having a connector for connecting the device to a processor.

In addition, the preferred embodiment further comprises a metering module having a plurality of visual display elements. The metering module is also coupled to the processing means for receiving programmed responses to the encoded signals. Based of the programmed responses received, the metering module provides visual feedback to the user through the visual display elements.

BRIEF DESCRIPTION OF THE DRAWINGS

The objects, features and advantages of the present invention will be apparent from the following detailed description of the preferred embodiment of the invention with references to the drawings in which.

DETAILED DESCRIPTION OF THE INVENTION

The preferred embodiment of the present invention discussed herein will be described in the context of an illustrative processor controlled system with a variety of input and output devices including an exemplary control center that utilizes the preferred embodiment of the variable scale input device of the present invention. Those who are skilled in the art will appreciate that the present invention is not limited to such a system and the variable scale input device may be utilized with any processor/microprocessor controlled machines/systems configured with a variety of peripherals and input-/output devices.

Figure 1:
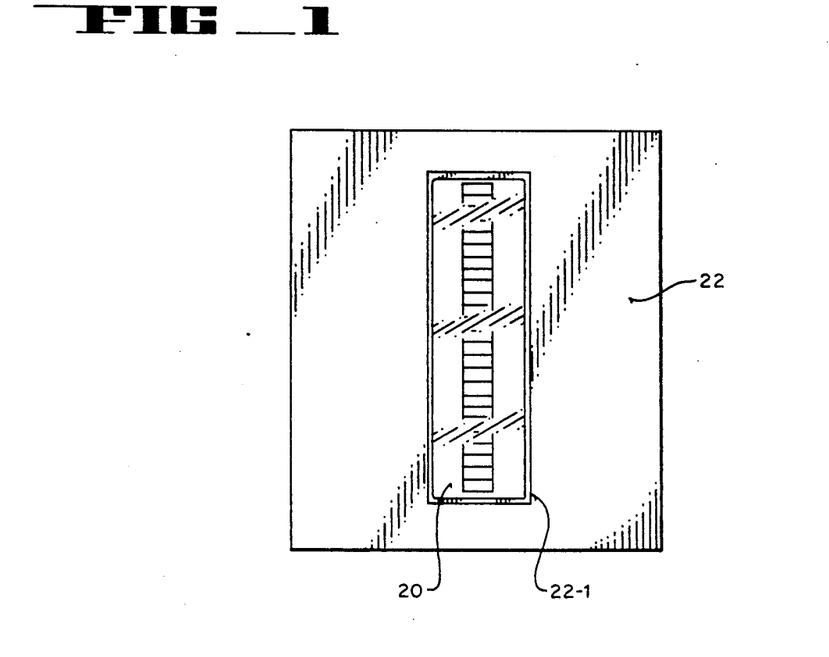
FIG. 1 is a top view of the variable scale input device of the present invention packaged with an exemplary flat cover having a center cut out.

Referring now to FIG. 1, the top view of the preferred embodiment of the variable input device of the present invention 20 is shown packaged with an exemplary flat cover 22. The top of the device 20 is flushed against the flat cover 22 and shows through the cut out 22-1 allowing the user to access and operate the device 20. It will be understood that the present invention is not limited to the exemplary packaging and the variable scale input device 20 may be packaged in a wide variety of manners.

Figure 2A:
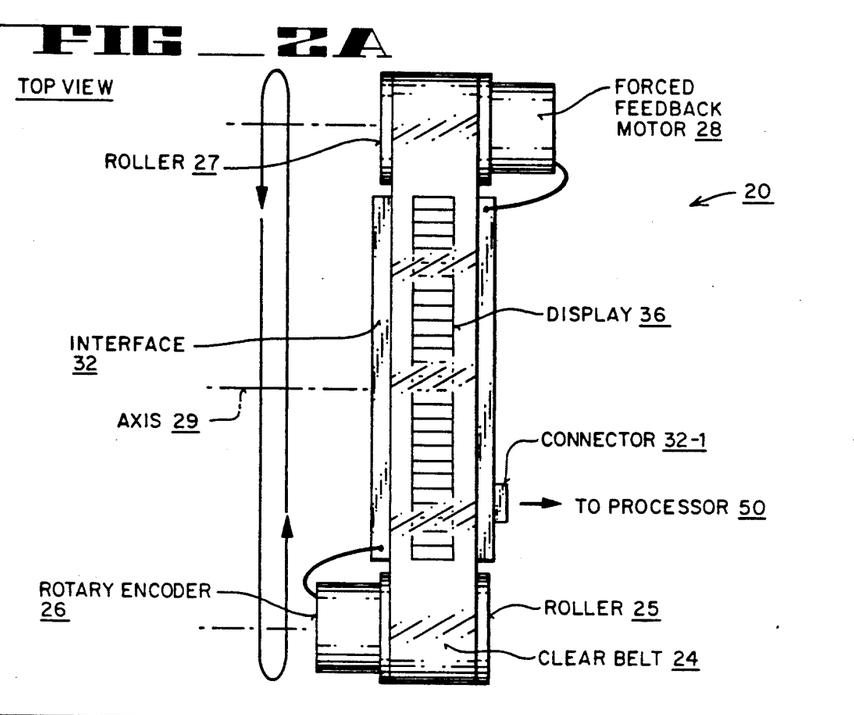
FIGS. 2a-2b are the top view and side view of the variable scale input device of the present invention without the exemplary flat cover.
Figure 2B:
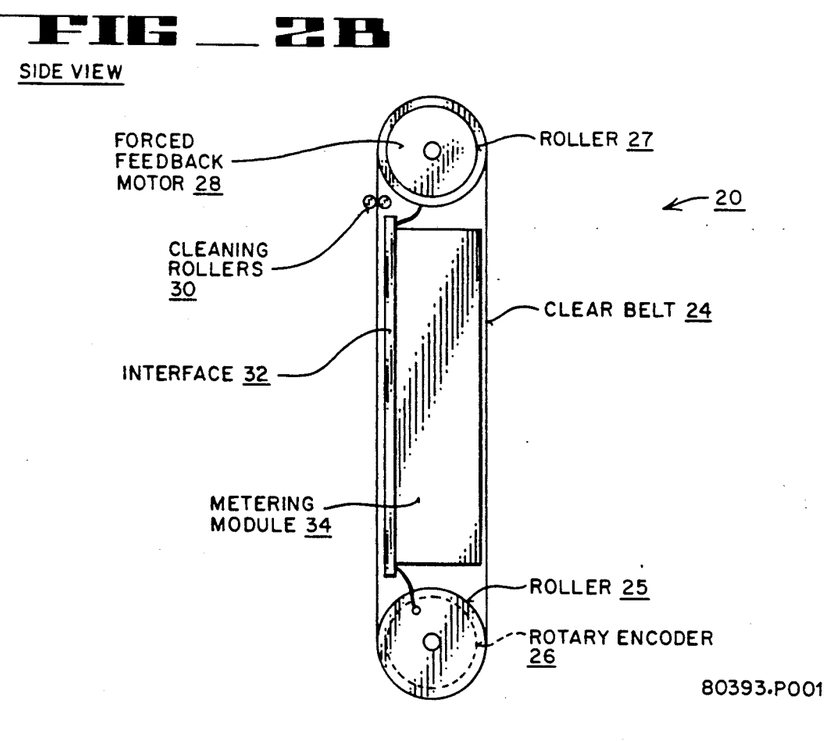

FIGS. 2a and 2b illustrate the elements of the preferred embodiment of the variable scale input device of the present invention 20, as seen from the top view and the side view without the exemplary flat cover 22. The device 20 comprises a belt 24 suspended over a first roller 25 at a first end of the belt and a second roller 27 at a second end, a rotary encoder 26 coupled to the first roller 25, and an interface 32 coupled to the rotary encoder 26. The interface 32 includes a connector 32-1 for coupling the device 20 to a processor 50. In addition, the device 20 also comprises a forced feedback motor/clutch 28 coupled to the second roller 27, a metering module 34 having a plurality of visual displays 36, a touch sensing means (not shown) and a plurality of cleaning rollers 30. The forced feedback motor/clutch 28, the metering module 34 and the touch sensing means are also coupled to the interface 32.

While the preferred embodiment described herein includes the forced feedback motor/clutch 28, the metering module 34, the variable scale input, the touch sensing means and the cleaning rollers 30, it should be understood that the invention is not limited to such a combination and any of the above elements may be utilized within the scope of the invention. In addition, while the preferred embodiment described herein describes the device 20 as coupled to an external processor 50, the interface 32 may include its own internal microprocessor thus enabling the device to be programmable and negating the need for an external processor 50.

The user provides input of his/her selection of values from the range of permissible values by moving the belt 24 circularly around the first roller 25 and the second roller 27 using his/her finger or other object such as the eraser tip of a pencil. The increase or decrease of the current value is represented by the clockwise or counterclockwise movements of the belt 24 around its own axis of rotation 29 (or vice versa). The amount of increase or decrease is represented by the amount of movements of the belt 24. There are no limits to the number of revolutions the belt 24 may move circularly around the first and second rollers 25, 27. Thus, the range of permissible values available for selection and the resolution of the selectable values are virtually 'limitless'. Similarly, other well known rotating means having its own axis of rotation, such as discs or wheels, which may continuously rotate around the axis thorough its center may be used.

The belt is wide enough for easy access by an instrument, such as a finger or an eraser tip of a pencil. The belt also has a dual durometer construction, the outer surface is somewhat textured such that the user can move the belt in the desired direction, but the inner surface is smooth enough to allow the belt to easily rotate around the rollers 25, 27. Preferably, the belt 24 is made of a smooth transparent material such as clear silicone to allow the metering module, including the visual displays 36, to be compactly packaged in the space enclosed by the belt 24 and visible to the user.

As the user moves the belt 24 around the first and second rollers 25, 27, the rotary encoder 26 detects the direction and the amount of movement of the belt 24, encodes signals correspondingly and sends the signals to the interface 32. The rotary encoder 26 may also provide information as to the velocity and acceleration of movement of the belt. The rotary encoder 26 may be of any of the well known encoding means such as an optical or a Hall effect encoder. For further information on rotary encoders, see Horowitz and Hill, *The Art of Electronics*, (Cambridge, 1989), pp. 557,799.

In the preferred embodiment, the interface 32 sends and receives signals between the rotary encoder 26, the forced feedback motor/clutch 28, the metering module 34 and the processor 50. When the interface 32 receives the signals from the rotary encoder 26 representing the direction and the amount of movement of the belt 24, the signals are transmitted to the processor 50. The processor 50 analyzes the signals received and sends programmed responding signals to interface 32 in accordance with the program controlled range of permissible values available for selection and the program controlled resolution of the selectable values. As is explained below, the interface 33 sends the signals to the forced feedback motor/clutch 28 and/or the metering module 34 upon receipt of the programmed responding signals from the processor 50 to provide tactile and/or visual feedback to the user. It should be understood that the technique and means of sending and receiving the encoded and programmed responding signals may be achieved by any known communication techniques.

The forced feedback motor/clutch 28 provides tactile feedback to the user through the belt 24. The user perceives the feedback by sensing a change in the movability of the belt 24. The movability of the belt is changed by increasing or decreasing the resistance applied to it by the forced feedback motor/clutch 28. The forced feedback motor/clutch 28 varies the resistance according to the programmed responding signals it receives from the processor 50, through the interface 32. The forced feedback motor/clutch 28 varies the resistance applied by varying its coefficient of friction according to the programmed responses from the processor 50.

The amount of resistance applied over a range of permissible values available for selection is program controlled by the processor according to the desired responsiveness to be provided. Thus, for example, the resistance may be program controlled to vary non-linearly as a function of the distance between the current value and the outer limits of the range, as represented by the exemplary curves 88 in FIG. 3. The relative amount of resistance applied is the strongest when the user is operating close to the outer limits of the range and weakest when the user is operating within the middle of the range. Therefore, the user perceives an increasing difficulty in moving the belt 24 as he/she approaches the outer limits of the range.

Figure 3:
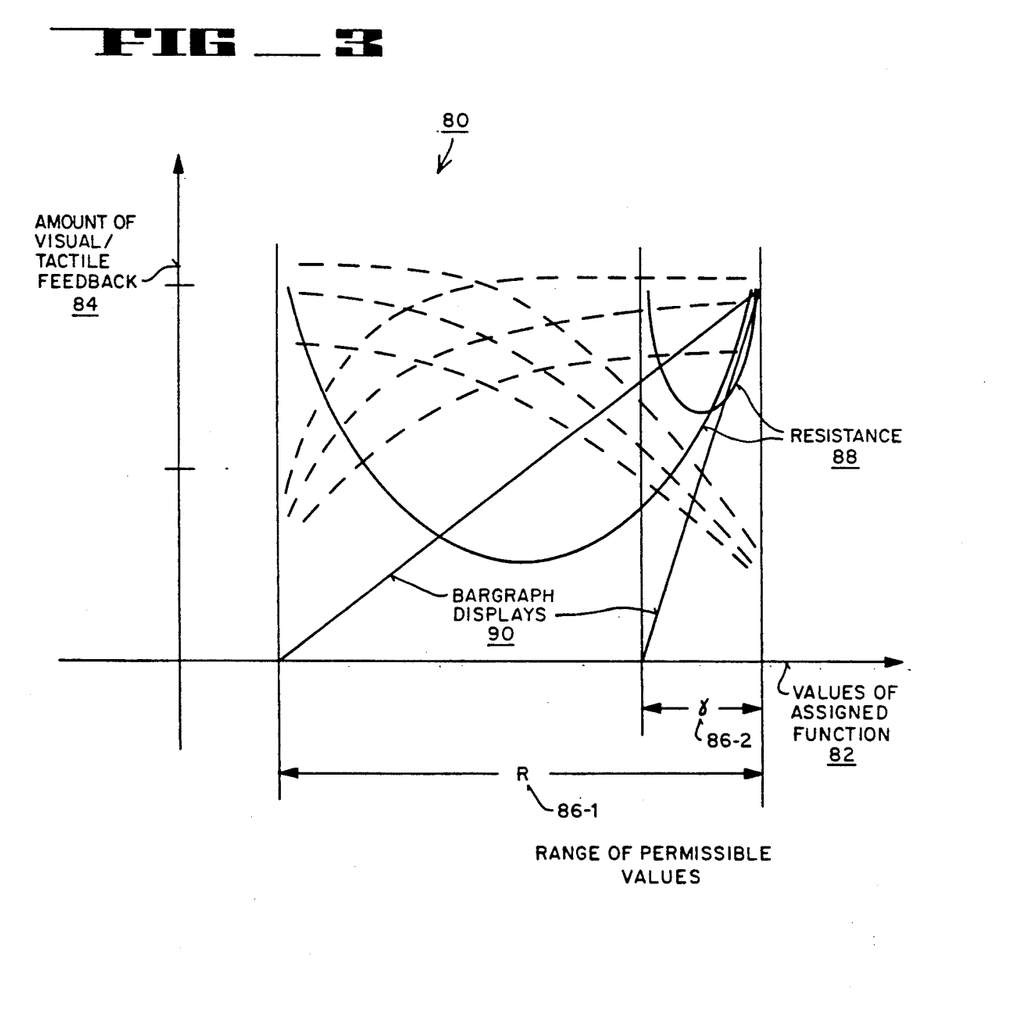
FIG. 3 is a graphical illustration of an exemplary amount of visual and tactile feedbacks provided over a range of permissible values.

The amount of resistance applied over the range of permissible values available for selection may also be programmed controlled to vary according to the width of the range, as illustrated by the relative positions of the exemplary curves 88 in FIG. 3. By lowering the resistance applied for wider ranges, the belt 24 may be moved more rapidly, thus allowing the user to quickly increase or decrease the current value. On the other hand, by increasing the resistance applied for narrower ranges, the belt 24 may only be moved slowly, thus providing a higher degree of resolution for the selectable values and enabling the user to fine tune his/her selection.

The metering module 34 provides visual feedback to the user through the actuation of the visual elements of the visual display 36. The user perceives the feedback by observing the visual elements actuated. The visual elements actuated are varied by the metering module 34 according to the programmed responding signals it receives from the processor 50, through the interface 32. The visual displays may, for example, simply be light emitting diodes or color displays in which the colors displayed provided the feedback to the user. Preferably, a bar graph display is used comprising an electroluminent, LED or plasma display.

The visual elements actuated are program controlled by the processor 50. For example, the visual elements actuated may be program controlled to indicate to the user how quickly the user is moving through the range of inputs values. Alternatively, the visual elements actuated may be program controlled to be proportional to the movements of the belt 24, but inversely proportional to the operating range of permissible values available for selection and the resolution of the selectable values, as illustrated by the lines 90 in FIG. 3. The metering module provides the user a quick way to determine the current value and its relative position to the outer limits of the range. The user may also quickly ascertain how much more movements are required to reach the desired value and vary his/her action on the belt 24 accordingly.

The touch sensing means provides to the user a simple, accessible input means for indicating binary choices. The user provides his/her input by touching or tapping the belt 24 with his/her finger. Preferably, the touch sensing means is a capacitance sensing means which senses the change of capacitance caused by the belt 24 being touched, or a proximity switch wherein the proximity of a finger in the area of the belt is sensed. For further information on capacitance sensing means, see D. Lancaster, *CMOS Cookbook* (H. W. Sam & Co, 1977), pp. 278-281.

As the user touches or taps the belt 24, the touch sensing means sends a signal representing the touching or tapping to the interface 32. The interface 32 in turn sends the signal to the processor 50 for processing. Alternatively, the signal may be sent to an auxiliary display. The disposition of the signal by the processor 50 is application dependent.

The touch sensing means may be used for a variety of situations. For example, it is useful for indicating a positive or negative response to a system prompt. In addition, it may be used for delineating the marking or unmarking of the outer limits of the range of permissible values available for selection, thus enabling the user to quickly and easily change the range while using the variable scale input device of the present invention 20.

Preferably cleaning roller 30 are included to ensure smooth and consistent operation of the variable scale input device 20. The cleaning rollers 30 achieve these objectives by constantly removing dirts and soils from the belt 24, thereby preventing any build up which may cause the belt to lose its optical transparency or the device to malfunction. The cleaning rollers 30 are coupled to the belt 24 such that the belt 24 passes through the cleaning rollers 30 when the belt 24 is moved circularly around the first and second rollers 25, 27. The cleaning rollers 30 are designed to remove the dirt and soil with minimal increase in friction against the movement of the belt 24. Other well known cleaning means may also be used provided they are complementary to the materials used for the belt 24 and impose minimal frictions against the movement of the belt 24.

Figure 4:
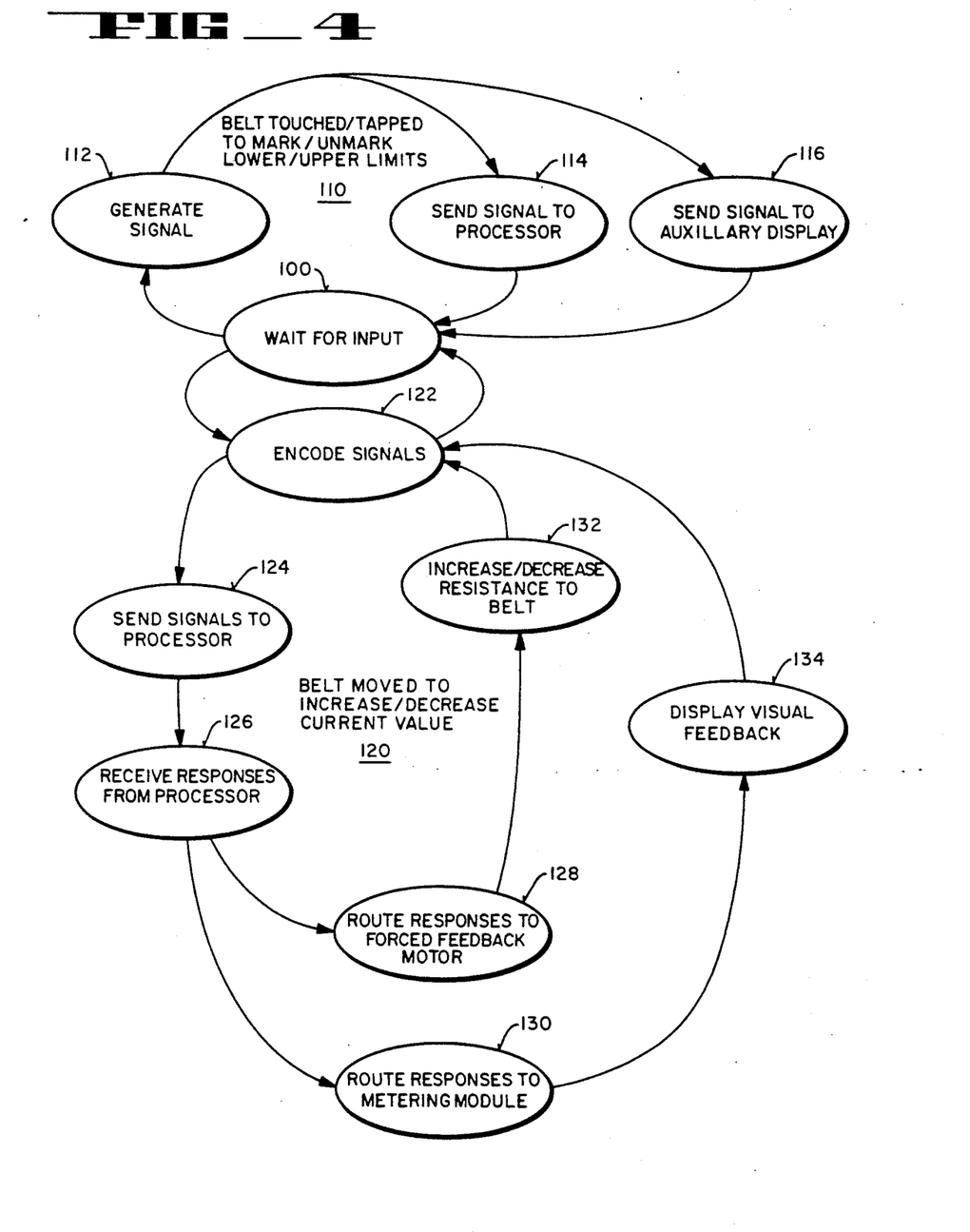
FIG. 4 is a state diagram showing exemplary states of the variable scale input device of the present invention during its operation.

FIG. 4 is an exemplary state diagram representing one approach to the operation of the variable scale input device, illustrating possible operations that may be executed. The device 20 is in a wait state 100 until it receives input. There are two basic types of input. The belt is either touched or tapped as represented by the upper loop 110 or moved as represented by the lower loop 120. As discussed earlier, the first type of input may be used to mark or unmark the lower or upper limits of the range of permissible values available for selection, and the second type of input may be used to increase or decrease the current value.

If the belt is touched or tapped 110, the device generates a signal 112 and the signal is sent to the processor 114. Alternatively, the signal may be sent to an auxillary display 116. The device then returns to a wait state 100. If, instead, the belt is moved 120, the device encodes signals 122 and the signals are sent to the processor 124. Upon receiving programmed responses from the processor 126, the device routes the programmed responses to the forced feedback motor/clutch and the metering module 128, 130. Acting upon the programmed responses, the device increases or decreases the resistance applied to the belt 132 and displays visual feedback to the user 134.

Figure 5:
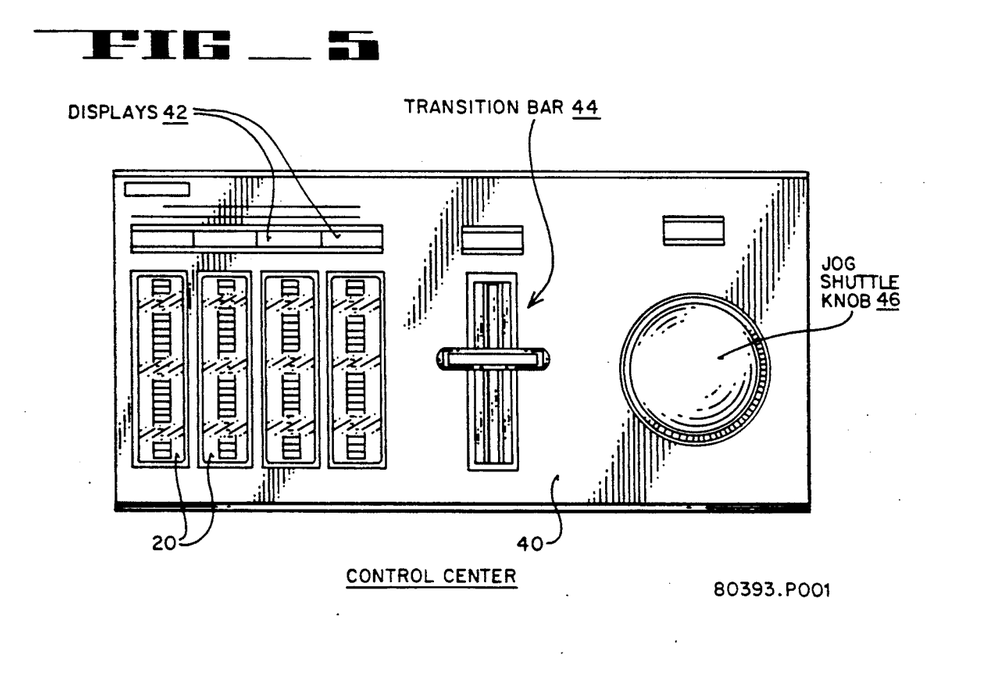
FIG. 5 is the top view of an exemplary control center utilizing the variable scale input device of the present invention.
Figure 6:
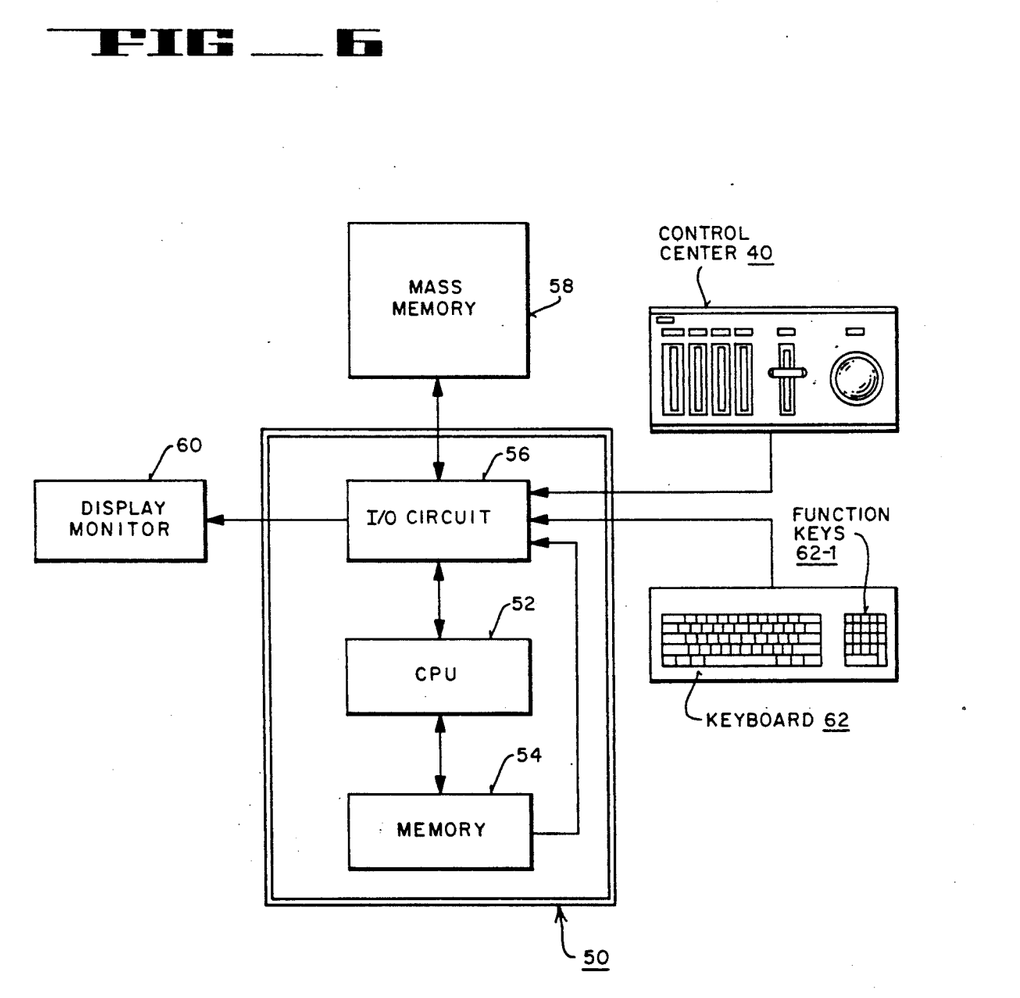
FIG. 6 is an illustrative processor controlled system employing the exemplary control center as one of its input devices.

FIG. 5 and FIG. 6 illustrates an exemplary processor controlled audio/video editing application utilizing the variable scale input device of the present invention 20. FIG. 5 shows the top view of an exemplary control center 40 comprising a plurality of variable scale input devices 20. These devices 20 are clustered together so they may be operated simultaneously by the user with one hand. In addition to these devices 20, the control center 40 also includes a plurality of alphanumeric displays 42 and other input means such as a transition bar 44 and a jog shuttle knob 46. The alphanumeric displays 42 are used to indicate to the user the current status of utilization of the variable scale input device 20 or to provide limited alphanumeric feedback to the user regarding the operation of the device 20. The other input means 44, 46 are included to illustrate how the variable scale input device of the present invention 20 may be packaged with other complimentary input means.

FIG. 6 shows an illustrative processor controlled system 50 employing the exemplary control center 40 illustrated in FIG. 5 as one of its input devices. In addition to the exemplary control center 40, the illustrative processor controlled system 50 comprises a typical processor 50 having a central processing unit (CPU) 52, memory 54 and input/output (I/O) circuit 56 and a plurality of peripheral devices including mass memory 58, a display monitor 60 and a traditional keyboard 62 having a plurality of function keys 62-1.

In the processor controlled system 50, each of the variable scale input devices 20 included in the control center 40 is assigned a different function. For example, the assigned function for one of the devices 20 is to provide input to identify the desirable audio level, while the assigned function of another is to provide input to identify the desirable brightness of the video. The assigned function, i.e. audio level or brightness, or the current input value may alternatively be displayed on the alphanumeric displays 42 when the belt is touched or tapped.

The user may also tap the belt 24 of one of the variable scale input device 20 to indicate the selection of an assigned function, e.g. audio level or brightness, to work with. As discussed earlier, the touch sensing means generates a binary signal representing the tapping. The signal is sent to the interface 32. The interface 32 in turn sends the signal to the processor 50 and the processor 50 may direct the alphanumeric displays 42, the LED metering module 34 and the forced feedback motor/clutch 28 to provide the proper visual and tactile feedback to the user.

For example, the processor 50 may direct the alphanumeric displays 42 to change the displays from 'audio level' or 'brightness' to the current value of the audio level or brightness in the units of decibel or units of lumen. The processor 50 may also direct the LED metering module to light up a specific number of the LED array display 36 showing a bar graph representing the location of the current value in the range of permissible values available for selection. In addition, the processor 50 may direct the forced feedback motor/clutch 28 to apply to the appropriate level of resistance to the belt 24 depending upon the location of the current value in the range.

The user may increase or decrease the current value of the audio level or brightness by moving the belt 24 circularly around the first and second rollers 25, 27 with his/her finger or an object such as the eraser tip of a pencil. As discussed earlier, the rotary encoder 26 encodes signals corresponding to the direction and the amount of movement of the belt 24, and sends the signals to the interface 32. The interface 32 in turn sends the signals to the processor 50 and the processor 50 may provide programmed responding signals directing the alphanumeric displays 42, the metering module 34 and the forced feedback motor/clutch 28 to provide the proper visual and tactile feedbacks to the user according to the program controlled operating range and resolution.

For example, the current value of the assigned function displayed in the alphanumeric displays 42 may be increased or decreased to correspond to the movement of the belt 24. At the same time, the number of LEDs 36 actuated, representing the current value of audio level or brightness, may also be increased or decreased to correspond to the movement of the belt 24. In addition, the amount of resistance applied by the forced feedback motor/clutch 28 to the belt 24 may be increased or decreased as the current value approaches or backs away from the outer limits of the program controlled range of permissible values available for selection.

Assuming in the present example that the initial program controlled range of permissible values available for selection and the program controlled resolution of the selectable values are initialized with default values, the program controlled range and resolution of the device 20 may be reset in a number of ways. The traditional keyboard 62 with its function keys 62-1 may be used. Alternatively, the range may also be reset using the variable scale input device 20. The user may tap the belt 24 when one of the desired outer limits is reached. The signal generated by the device 20 indicates to the processor 50 to unmark the limit. The user may then move to the new limit by moving the belt 24 in the appropriate direction. The user may tap the belt 24 again after reaching the new limit. Again, the signal generated by the device 20 indicates to the processor 50 to mark the current value as the new limit. It will be understood the processor 50 can determine whether the signal represents marking or unmarking based on the existence or non-existence of one of the limits.

By allowing the program controlled range of permissible values available for selection and the program controlled resolution of the selectable values be set dynamically, a higher degree of resolution may be achieved without having to sacrifice the range supported. For example, suppose a certain assigned function has a range of permissible values between 1 and 100, and the user desires a value with the resolution to the precision of the fourth decimal place such as 95.4321. The processor 50 may set the range of permissible values represented by certain amount of belt movement for 1 through 100 initially, as indicated by 'R' 86-1 in FIG. 3, thus allowing the user to move to values in the 90s with a relative small amount of belt movement and resistance. Acting upon the signal from the touch sensing means or any well known processor interrupt means such as function keys on the traditional keyboard, the processor may reset the range of permissible values to 90 through 100, for the same amount of belt movement as represented by 'r' 86-2 in FIG. 3. Alternatively, acting upon the signal the processor may increase the amount of belt movement required for the range 1 through 100. Therefore, the amount of belt movement between unit input values is increased, allowing the user to fine tune his/her selection.

While the present invention has been described in terms of a preferred embodiment, those skilled in the art will recognize that the invention can be practiced with modification and alternation within the spirit and scope of the appended claims to serve as a programmable or nonprogrammable variable scale input device to a wide variety of machines/systems.

What is claimed is:
1. A programmable variable scale input device for providing signals indicating selection of an input value from a range of permissible values, comprising:
 a transparent belt suspended over a first roller at a first end and a second roller at a second end, said belt rotating in a selected one of a counterclockwise and clockwise direction around said first and second rollers;

rotary encoding means coupled to said first roller for generating signals corresponding to said selected rotation;

tactile feedback means coupled to said belt for applying variable resistance against said rotation of said belt;

visual feedback means located in an area enclosed by said transparent belt for providing visual feedback to a user; and connector means coupled to said encoding means, said tactile feedback means, said visual feedback means and processing means for providing feedback signals to said generated signals, said connector means including interface means for receiving said generated signals from said rotary encoding means, sending said generated signals to said processing means, receiving said feedback signals from said processing means and sending said feedback signals to said tactile and visual feedback means.

2. The programmable variable scale input device as set forth in claim 1, wherein the composition of said transparent belt comprises clear silicone.

3. The programmable variable scale input device as set forth in claim 1, wherein said device further comprises a touch sensing means coupled to said belt and said interface means, said touch sensing means comprising means for detecting the touching of said belt and means for transmitting a binary signal to said interface means indicating said touching of said belt.

4. The programmable variable scale input device as set forth in claim 3, wherein said touch sensing means comprises a capacitance sensing means.

5. The programmable variable scale input device as set forth in claim 1, wherein said device further comprises a belt cleaning means coupled to said belt, said belt cleaning means cleaning said belt when said belt rotates around said first and second rollers.

6. The programmable variable scale input device as set forth in claim 5, wherein said belt cleaning means comprises a plurality of cleaning rollers.

7. The programmable variable scale input device as set forth in claim 1, wherein said rotary encoding means comprises a Hall effect encoder.

8. The programmable variable scale input device as set forth in claim 1, wherein said rotary encoding means comprises an optical encoder.

9. The programmable variable scale input device as set forth in claim 1, wherein said generated signals include signals indicating velocity and acceleration of the said rotations.

10. The programmable variable scale input device as set forth in claim 1, wherein said visual feedback means comprises a metering module coupled to said interface means to receive feedback signals from said interface means, said metering module comprising at least one visual display element which is actuated according to the received feedback signals.

11. The programmable variable scale input device as set forth in claim 10, wherein said metering module comprises a Light Emitting Diode (LED) metering module comprising an array of LEDs for displaying bar graphs.

12. The programmable variable scale input device as set forth in claim 1, wherein said tactile feedback means comprises a forced feedback motor/clutch coupled to said belt.

13. A variable scale input device for providing signals indicating selection of an input value from a range of permissible values, comprising:

a transparent belt suspended over a first roller at a first end and a second roller at a second end, said belt rotating in a selected one of a counterclockwise and clockwise direction around said first and second rollers;

rotary encoding means coupled to said first roller for generating signals corresponding to said selected rotation;

tactile feedback means coupled to said belt for applying variable resistance against said rotation of said belt;

metering module means located in an area enclosed by said transparent belt for providing visual feedback to a user; and interface means coupled to said encoding means, said tactile feedback means, said metering module means and a processor comprising, means for receiving said generated signal, means for sending said generated signal to said processor, means for receiving feedback signals from said processor, and means for sending said feedback signals to said tactile feedback means and said metering module means.

14. The variable scale input device as set forth in claim 13, wherein the composition of said transparent belt comprises clear silicone.

15. The variable scale input device as set forth in claim 13, wherein said device further comprises a touch sensing means coupled to said belt, and said interface means, said touch sensing means comprising means for detecting the touching of said belt and transmitting a binary signal to said interface means indicating said touching of said belt.

16. The variable scale input device as set forth in claim 15, wherein said touch sensing means comprises a capacitance sensing means.

17. The variable scale input device as set forth in claim 13, wherein said device further comprises a belt cleaning means coupled to said belt, said belt cleaning means cleaning said belt when said belt rotates around said first and second rollers.

18. The variable scale input device as set forth in claim 17, wherein said belt cleaning means comprises a plurality of cleaning rollers.

19. The variable scale input device as set forth in claim 13, wherein said rotary encoding means comprises a Hall effect encoder.

20. The variable scale input device as set forth in claim 13, wherein said rotary encoding means comprises an optical encoder.

21. The variable scale input device as set forth in claim 13, wherein said generated signals include signals indicating velocity and acceleration of said rotations.

22. The variable scale input device as set forth in claim 13, wherein said tactile feedback means comprises a forced feedback motor/clutch coupled to said belt.

23. The variable scale input device as set forth in claim 13, wherein said metering module means comprises at least one visual display element which is actuated according to the received feedback signals.

24. The variable scale input device as set forth in claim 23, wherein said metering module means comprises a Light emitting Diode (LED) metering module comprising an array of LEDs for displaying bar graphs.

25. A variable scale input device for providing signals indicating selection of an input value from a range of permissible values, comprising:

a transparent belt suspended over a first roller at a first end and a second roller at a second end, said belt rotating over said first and second rollers in a selected one of a clockwise and counterclockwise direction;

rotary encoding means coupled to said first roller for generating a signal corresponding to said selected rotation of the belt;

a forced feedback motor/clutch coupled to said second roller for applying variable resistance against said rotation of said belt;

metering module means located in an area enclosed by said transparent belt for providing visual feedback to a user; and interface means coupled to said encoding means, said forced feedback motor/clutch, said metering module means and a processor comprising;

means for receiving said generated signal, means for sending said generated signal to said processor, means for receiving feedback signals from said processor, and means for sending said feedback signals to said forced feedback motor/clutch and said metering module means.

26. The variable scale input device as set forth in claim 25, wherein the composition of said transparent belt comprises clear silicone.

27. The variable scale input device as set forth in claim 25, wherein said device further comprises a touch sensing means coupled to said belt and said interface means, said touch sensing means comprising means for detecting the touching of said belt and transmitting a binary signal to said interface means indicating said touching of said belt.

28. The variable scale input device as set forth in claim 27, wherein said touch sensing means comprises a capacitance sensing means.

29. The variable scale input device as set forth in claim 25, wherein said device further comprises a belt cleaning means coupled to said belt, said belt cleaning means cleaning said belt when said belt rotates around said first and second rollers.

30. The variable scale input device as set forth in claim 29, wherein said belt cleaning means comprises a plurality of cleaning rollers.

31. The variable scale input device as set forth in claim 25, wherein said rotary encoding means comprises a Hall effect encoder.

32. The variable scale input device as set forth in claim 25, wherein said rotary encoding means comprises an optical encoder.

33. The variable scale input device as set forth in claim 25, wherein said generated signals include signals indicating velocity and acceleration of said rotations.

34. The variable scale input device as set forth in claim 25, wherein said metering module means comprises at least one visual display element which is actuated according to the received feedback signals.

35. The variable scale input device as set forth in claim 34, wherein said metering module means comprises a Light Emitting Diode (LED) metering module comprising an array of LEDs for displaying bar graphs.

* * * * *